US012785324B2

(12) United States Patent
Wang et al.

(10) Patent No.: US 12,785,324 B2
(45) Date of Patent: Nov. 3, 2026

(54) REGISTERED JACK CONNECTOR

(71) Applicant: Capatronics Electronics (kunshan) Co., Ltd., Kunshan (CN)

(72) Inventors: Chuanbao Wang, Kunshan (CN); Zhiwei Wang, Kunshan (CN)

(73) Assignee: Capatronics Electronics (kunshan) Co., Ltd., Kunshan (CN)

( * ) Notice: Subject to any disclaimer, the term of this patent is extended or adjusted under 35 U.S.C. 154(b) by 338 days.

(21) Appl. No.: 18/676,668

(22) Filed: May 29, 2024

(65) Prior Publication Data

US 2025/0158324 A1 May 15, 2025

(30) Foreign Application Priority Data

Nov. 15, 2023 (CN) ........................ 202311520764.9

(51) Int. Cl.
*H01R 13/627* (2006.01)
*H01R 13/502* (2006.01)

(52) U.S. Cl.
CPC ....... *H01R 13/6271* (2013.01); *H01R 13/502* (2013.01)

(58) Field of Classification Search
CPC .......................... H01R 13/6271; H01R 13/502
USPC ................................................. 439/350, 352
See application file for complete search history.

(56) References Cited

U.S. PATENT DOCUMENTS

| | | | | |
|---|---|---|---|---|
| 7,465,180 | B2 * | 12/2008 | Kusuda | H01R 13/6272 439/352 |
| 7,901,250 | B2 * | 3/2011 | Lam | H01R 13/635 439/352 |
| 8,512,062 | B1 * | 8/2013 | Zhou | H01R 13/635 439/352 |
| 9,825,403 | B2 * | 11/2017 | De Dios Martin | H01R 43/26 |
| 2003/0220008 | A1 * | 11/2003 | Viklund | H01R 13/629 439/352 |

FOREIGN PATENT DOCUMENTS

| | | | |
|---|---|---|---|
| CN | 202957410 | U | 5/2013 |
| CN | 209544658 | U | 10/2019 |
| CN | 210040699 | U | 2/2020 |
| CN | 111817082 | A | 10/2020 |
| CN | 115275695 | A | 11/2022 |

* cited by examiner

*Primary Examiner* — Gary F Paumen

(57) ABSTRACT

The present invention discloses a registered jack connector, including a connector housing, a detachment device being provided on the connector housing, the detachment device including: the elastic piece being inclined along a length direction; the pressing piece including a pressing part and a restoring part, the pressing part including an inclined surface, the inclined surface being inclined along the length direction and opposite to an inclination direction of the elastic piece, the pressing part being clamped with a high end of the elastic piece at a high end of the inclined surface, the pressing part being clamped with the connector housing at a low end of the inclined surface, the restoring part being located at a lower end of the inclined surface and providing an upward restoring force for the pressing part. The connector can reduce the size of the connector in the length direction and is easy to plug.

13 Claims, 14 Drawing Sheets

REGISTERED JACK CONNECTOR

CROSS REFERENCE TO RELATED APPLICATIONS

The present application claims the benefit of Chinese Patent Application No. 202311520764.9 filed on Nov. 15, 2023, the contents of which are incorporated herein by reference in their entirety.

TECHNICAL FIELD

The present invention relates to a registered jack connector.

BACKGROUND

A registered jack connector is used for establishing a network connection between a first cable and a second cable, or is also used for establishing a network connection between a first cable and an electrical appliance.

In order to ensure the stable connection between a cable and the registered jack connector, when the cable is connected with the registered jack connector, it is often necessary to provide a cable tie to fix the cable and the registered jack connector. A clamp structure is often provided on an outer side of a length direction of the registered jack connector, which undoubtedly requires increasing the length of the registered jack connector. However, under certain conditions, it is required that the size of the registered jack connector should not be too large, so it is necessary to minimize the size of the registered jack connector as much as possible to save space, especially the size in the length direction of the registered jack connector. This requires the design of a registered jack connector that can meet the requirement of cable fixation without occupying the space of the registered jack connector. At the same time, in order to facilitate the registered jack connector being inserted into a socket, an elastic piece is often provided on the registered jack connector. When the elastic piece is pressed, the registered jack connector can be taken down from the socket. The elastic piece is usually an integrally injection-molded part, for example, in the utility model patent application with publication number CN209544658U. Due to the narrow spacing between the registered jack connectors, it is difficult for human hands to reach a plug head of the registered connector and press down on the elastic piece to take it out. In addition, the elastic force of the elastic piece is insufficient. But if the elastic piece is extended for easy pressing, for example, in the utility model patent with publication number CN210040699U, the elastic piece will occupy a large space, especially the elastic piece will protrude from the registered jack connector, making it unusable in some places with requirements on space.

SUMMARY

In order to overcome the above disadvantages, the purpose of the present invention is to provide a registered jack connector that can reduce the size of the connector in the length direction and facilitate plugging.

In order to achieve the purpose, the present invention adopts the following technical solution: a registered jack connector including a connector housing, a detachment device being provided on the connector housing, the detachment device including:

an elastic piece, the elastic piece being inclined along a length direction, a low end of the elastic piece being clamped with an end portion of the connector housing; and a pressing piece, the pressing piece including a pressing part and a restoring part, the pressing part including an inclined surface, the inclined surface being inclined along the length direction and opposite to an inclination direction of the elastic piece, the pressing part being clamped with a high end of the elastic piece at a high end of the inclined surface, the pressing part being clamped with the connector housing at a low end of the inclined surface, the restoring part being located at a lower end of the inclined surface and providing an upward restoring force for the pressing part.

The present invention has the following beneficial effects: by pressing the connection between the elastic piece and the pressing piece, the elastic piece swings downwards, and the entire elastic piece moves downwards to facilitate the registered jack connector being inserted into a socket. When the external force is withdrawn, on the one hand, due to the elastic force of the pressing part and the elastic piece itself, both of them are restored upwards; on the other hand, the restoring force provided by the restoring part for the pressing part drives the elastic piece to be restored upwards, allowing the registered jack connector to be tightly inserted into the socket. The detachment device adopts an elastic piece and a pressing piece in separate structures, thus increasing the elastic force of the detachment device and facilitating pressing. At the same time, the added restoring part provides a restoring elastic force, allowing the entire detachment device to have a larger restoring force even in the case of a smaller length, and thus facilitating the plugging of the connector.

Further, the restoring part includes at least one of a sheet-like structure and a spring. In other words, the restoring part may be a sheet-like structure, a spring, or a sheet-like structure and a spring, as long as it can provide an elastic force.

Further, the sheet-like structure is inclined in the length direction and opposite to an inclination direction of the inclined surface, a high end of the sheet-like structure is connected with the inclined surface, and a low end of the sheet-like structure leans against the connector housing. By using the elastic force of the sheet-like structure itself, the acting force for restoring the pressing part is increased.

Further, the spring is vertically provided along a height direction, one end of the spring leans against the inclined surface, and the other end leans against the connector housing. When there is no external force, the spring is in a natural state. When the external force presses the pressing part, the spring will be compressed. When the external force is withdrawn, the spring will convert the elastic force into the acting force for restoring the pressing part.

Further, the sheet-like structure and the pressing part are integrally formed or are separate structures. The fixing relationship between the sheet-like structure and the pressing part is not limited, as long as it can provide an elastic force for restoring the pressing part.

Further, the sheet-like structure is provided with a through hole for the spring to pass through. The through hole provides a space for avoiding the spring. In this case, the sheet-like structure and the spring form the restoring part. The sheet-like structure and the spring synchronously provide a restoring force, allowing the pressing part to have a larger restoring force.

Further, the inclined surface and the connector housing are respectively provided with spring fixing grooves for end portions of the spring to be embedded in. The spring fixing grooves facilitate the positioning of the spring.

Further, the connector housing includes a plugging part and a connecting part sequentially provided in the length direction, and the height of an upper end face of the plugging part is less than the height of an upper end face of the connecting part; the pressing piece is clamped with the connecting part, and the highest point of the pressing piece is not higher than the upper end face of the connecting part. In this case, the pressing piece will not protrude in the height direction and will not occupy additional space.

Further, an upper end face of the pressing part is a flat surface, and a boss protruding upwards from the upper end face of the pressing part is further provided at a connection between the pressing part and the spring. The boss provides a force applying point for a finger to press.

Further, the connector housing includes an upper cover and a lower shell, the upper cover and the lower shell form an accommodating chamber, a connecting functional core connected with a cable is provided in the accommodating chamber, and a cable hole is formed between the upper cover and the lower shell for the cable to pass through;

- a cable clip is further provided in the accommodating chamber, the cable clip is movable back and forth in a direction perpendicular to an axis direction of the cable to get close to or away from the cable, the upper cover or the lower shell is provided with an opening communicated with the accommodating chamber and corresponding to the position of the cable clip, and the cable clip moves towards the direction of the cable to tightly press the cable by passing the cable clip through the opening and applying an acting force to the cable clip.

The cable clip is located inside the connector. It is not needed to additionally provide a separate clamp structure for cable tying at an outer end portion of the connector, so that the overall length of the connector is smaller. Moreover, the connecting functional core is a structure that is already provided in the conventional technology connector, so it will not cause significant changes in the length of the connector housing due to the arrangement of a clamping protrusion.

Further, the cable clip includes a sheet-like base plate, an arc-shaped positioning edge is provided on one side of the base plate close to the cable, a surface of at least one side of the base plate is provided with at least one third clamping groove, and at least one clamping protrusion fit with the third clamping groove is provided on the connecting functional core.

Further, the third clamping groove includes a guide slope and a backstop surface, the clamping protrusion includes a clamping surface and a retaining surface, and the backstop surface of the third clamping groove is capable of pressing against the retaining surface of the clamping protrusion. During clamping, the guide slope of the third clamping groove is in contact with the clamping surface of the clamping protrusion and moves forward along the clamping surface, thus clamping the clamping protrusion into the groove body of the third clamping groove. After the cable is clamped, when the base plate of the cable clip moves away from the cable due to the expansion force of the cable, the backstop surface of the third clamping groove presses against the retaining surface of the clamping protrusion, thus ensuring that the cable clip will not retreat and achieving the clamping and fixing of the cable.

Further, the connecting functional core includes a cable gland fixedly connected with the cable, and the clamping protrusion is provided on the cable gland. Since the cable is fixed on the cable gland, by providing the clamping protrusion on the cable gland, the cable can be clamped more stably.

Further, the upper cover is hinged with the lower shell, the upper cover is capable of swinging up and down along the lower shell and being fixedly fastened with the lower shell, and the opening is provided in the upper cover.

DESCRIPTION OF REFERENCE SIGNS

Figure 1:
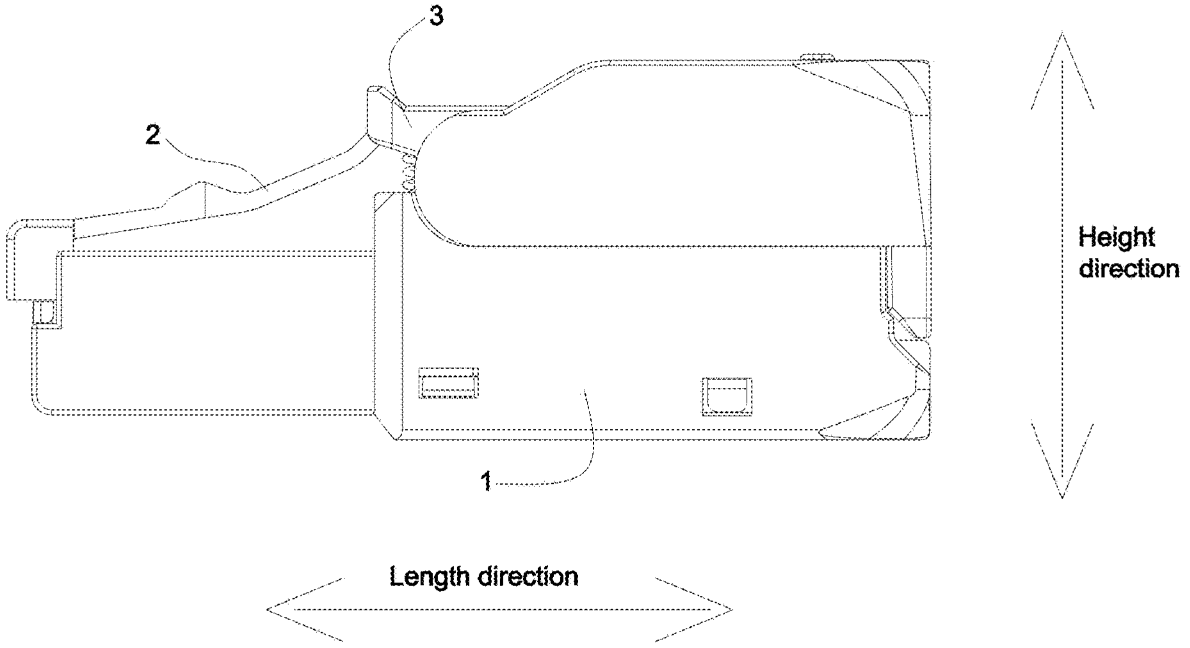
FIG. 1 illustrates a side view according to an embodiment of the present invention.

- 1—connector housing; 1*a*—plugging part; 1*b*—connecting part; 11—lower shell; 111—groove; 111*a*—first clamping block; 111*b*—first convex block; 111*c*—second spring fixing groove; 112—hinging seat; 12—upper cover; 121—connecting arm; 1211—rotating shaft; 122—second clamping groove; 123—opening; 124—guide plate; 13—cable hole;
- 2—elastic piece; 21—fixed clamping block; 22—connecting plate; 221—locking step; 23—plugging plate;
- 3—Pressing piece; 31—pressing part; 311—inclined surface; 312—first clamping groove; 313—first spring fixing groove; 314—boss; 315—first plugging groove; 32—restoring part; 321—sheet-like structure; 3211—through hole; 322—spring;
- 4—connecting functional core; 41—cable gland; 411—clamping protrusion; 4111—clamping surface; 4112—retaining surface; 42—terminal block; 43—PCB board; 44—fixing plate;

5—cable clip; 51—base plate; 511—third clamping groove; 5111—guide slope; 5112—backstop surface; 512—positioning edge; 52—clamping edge; 521—convex rib

DETAILED DESCRIPTION OF THE EMBODIMENTS

The exemplary embodiments of the present invention will be described below in detail with reference to the drawings, in order to make the advantages and features of the present invention more easily understood by those skilled in the art, and thus to clearly define the scope of protection of the present invention.

In the embodiments of the present invention, a first feature being above or below a second feature may include that the first feature and the second feature are in direct contact, or may include that the first feature and the second feature are not in direct contact but are in contact through an additional feature between them. In addition, the first feature being "above", "over", or "on" the second feature may include that the first feature is directly above or obliquely above the second feature, or may merely indicate that the horizontal position of the first feature is higher than that of the second feature. The first feature being "below", "underneath" or "under" the second feature may include that the first feature is directly below or obliquely below the second feature, or may merely indicate that the horizontal position of the first feature is lower than that of the second feature.

The following disclosure provides many different embodiments or examples to implement different structures in the embodiments of the present invention. In order to simplify the disclosure of the embodiments of the present invention, specific examples of components and arrangements will be described below. Of course, they are only examples and are not intended to limit the present invention. The embodiments of the present invention may repeat reference numbers and/or reference letters in different examples for the purpose of simplification and clarity, which do not indicate the relationship between the various embodiments and/or arrangements discussed. In addition, the embodiments of the present invention provide examples of various specific processes and materials, but those skilled in the art may be aware of the application of other processes and/or the use of other materials.

Embodiment 1

Referring to FIG. 1, this embodiment of the present invention provides a registered jack connector, which includes a connector housing 1. A detachment device is provided on the connector housing 1.

Figure 2:
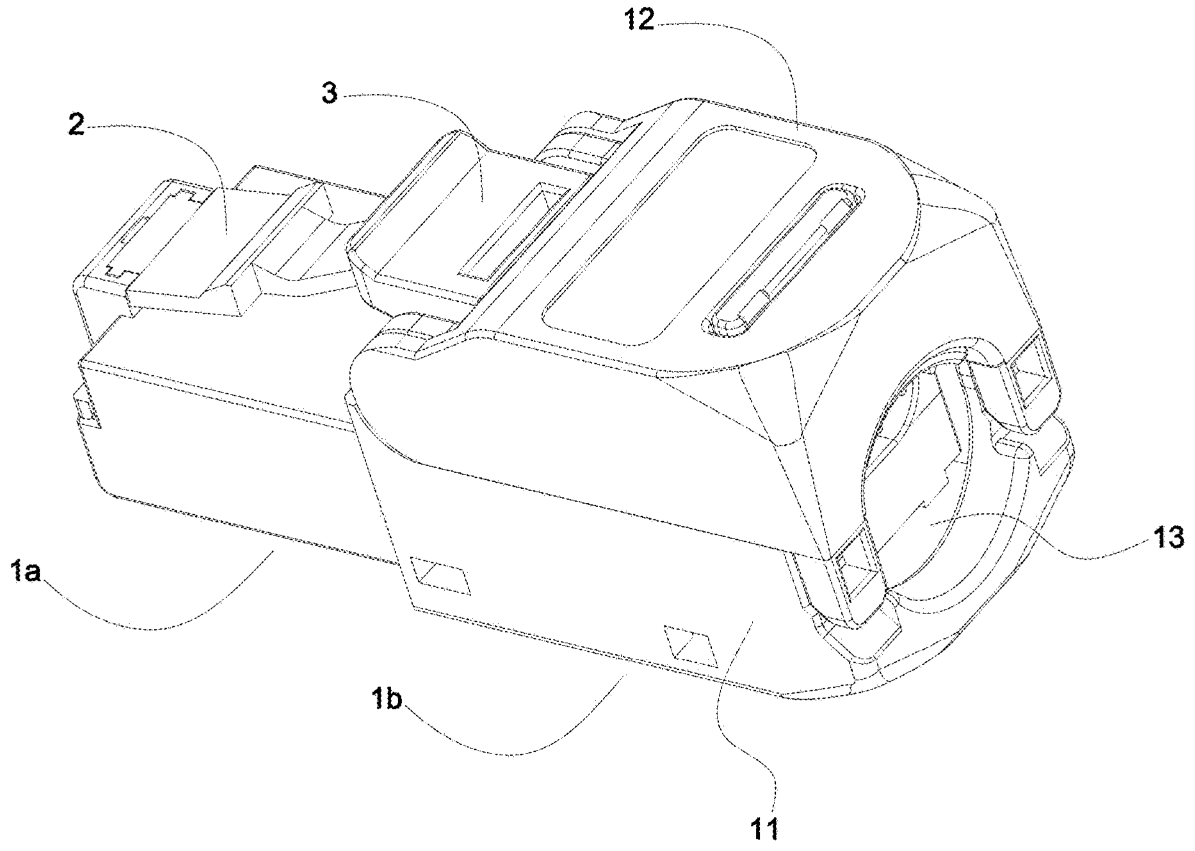
FIG. 2 illustrates a 3D structural schematic diagram according to an embodiment of the present invention.
Figure 10:
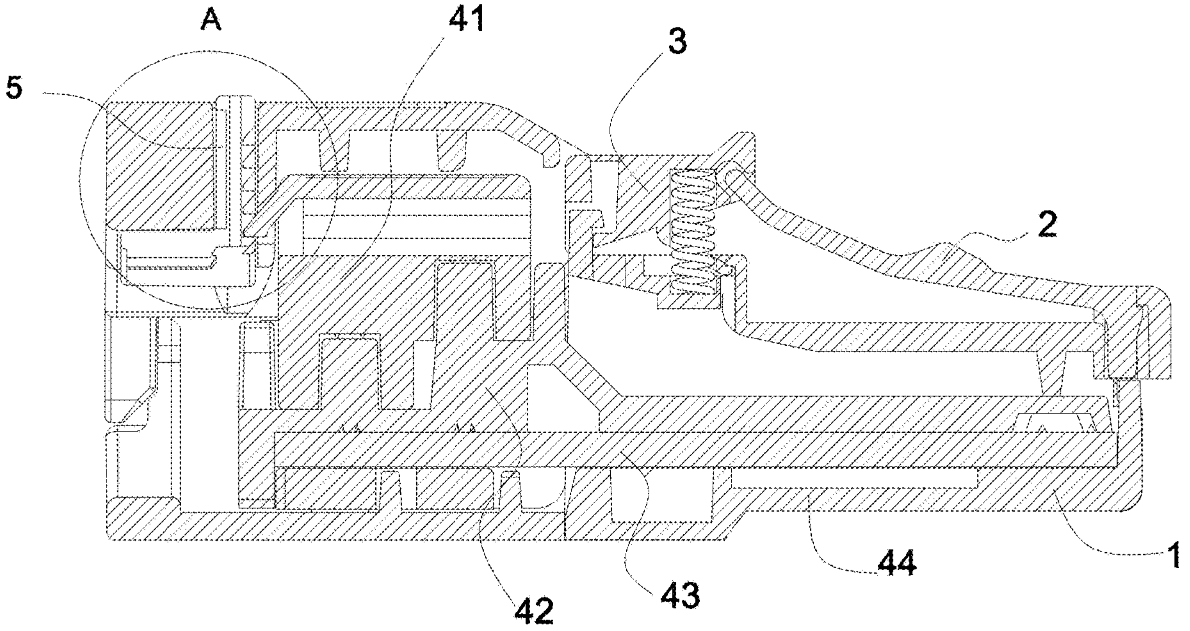
FIG. 10 illustrates a sectional view according to an embodiment of the present invention.

Referring to FIG. 1, FIG. 2 and FIG. 10, the detachment device includes an elastic piece 2 and a pressing piece 3 sequentially provided along a length direction. The elastic piece 2 is inclined along the length direction. A low end of the elastic piece is clamped with an end portion of the connector housing 1 to form a fixed point. The pressing piece 3 includes a pressing part 31. A lower end face of the pressing part 31 is an inclined surface 311 inclined along the length direction. The inclined surface 311 is opposite to the inclination direction of the elastic piece 2 in the length direction. The pressing part 31 is clamped with a high end of the elastic piece 2 at a high end of the inclined surface 311 to form a movable point. The pressing part 31 is clamped with the connector housing 1 at a low end of the inclined surface 311 to form a fixed point. A lower end of the inclined surface 311 is provided with a restoring part 32. The restoring part 32 provides an upward restoring force for the pressing part 31.

At the connection between the elastic piece 2 and the pressing piece 3, there is a gap between the height direction and the connector housing 1. By pressing the connection between the elastic piece 2 and the pressing piece 3, the elastic piece 2 swings downwards, and the entire elastic piece 2 moves downwards to facilitate the registered jack connector being inserted into a socket. When the external force is withdrawn, on the one hand, due to the elastic force of the pressing part 31 and the elastic piece 2 itself, both of them are restored upwards; on the other hand, the restoring force provided by the restoring part 32 for the pressing part 31 drives the elastic piece 2 to be restored upwards, allowing the registered jack connector to be tightly inserted into the socket.

In this embodiment, the detachment device adopts an elastic piece 2 and a pressing piece 3 in separate structures, thus increasing the elastic force of the detachment device and facilitating pressing. At the same time, the added restoring part 32 provides a restoring elastic force, allowing the entire detachment device to have a larger restoring force even in the case of a smaller length, thus facilitating the pressing.

In an embodiment, referring to FIG. 2, the connector housing 1 includes a plugging part 1*a* and a connecting part 1*b* sequentially provided in the length direction. The plugging part 1*a* can be inserted into the socket. Referring to FIG. 1, the height of an upper end face of the plugging part 1*a* is less than the height of an upper end face of the connecting part 1*b*, that is, a stepped structure is formed between the plugging part 1*a* and the upper end face of the connecting part 1*b*. The pressing piece 3 is clamped with the connecting part 1*b*. The highest point of the pressing piece 3 is not higher than the upper end face of the connecting part 1*b*. In this case, the pressing piece 3 will not protrude from the connecting part 1*b* in the height direction and will not occupy additional space.

Figure 9:
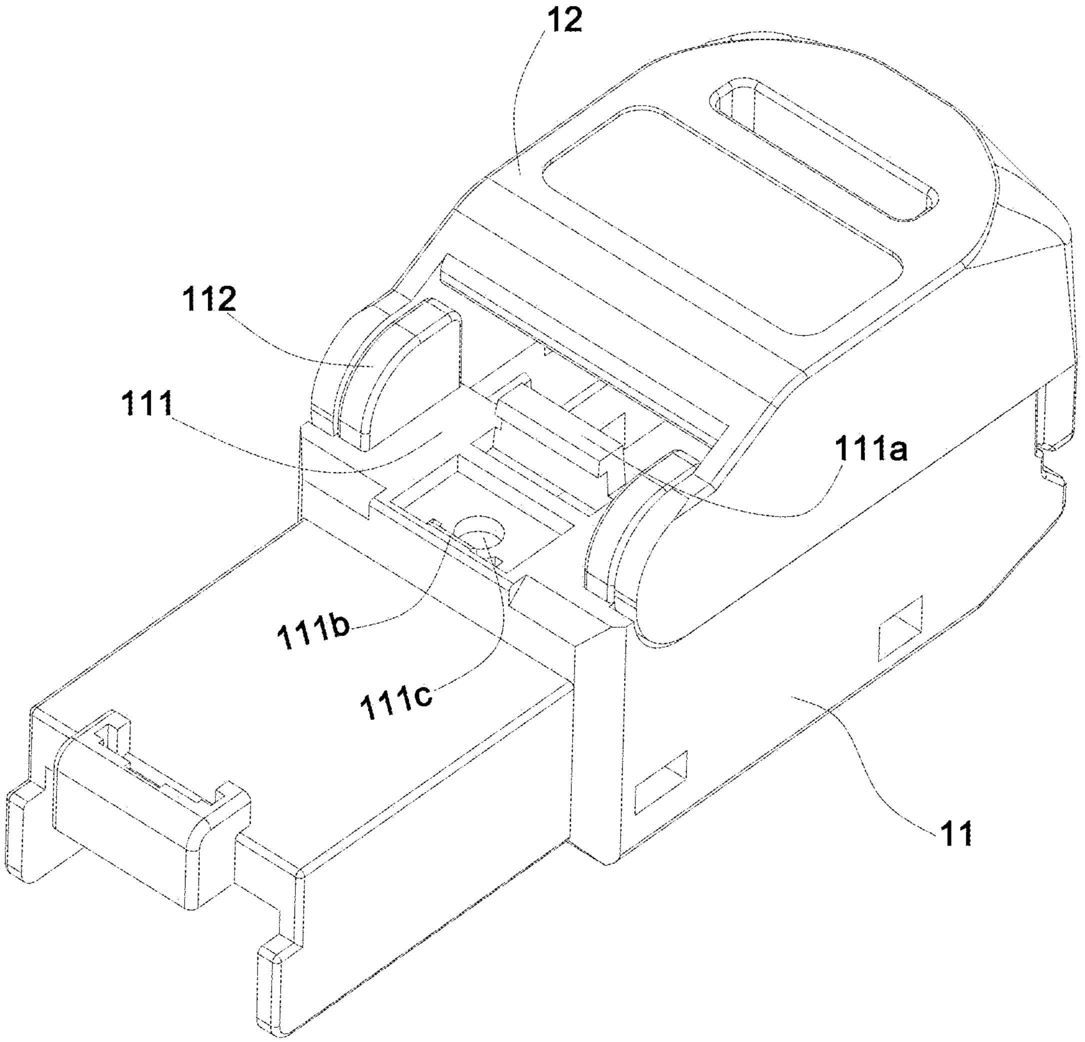
FIG. 9 illustrates a structural schematic diagram of a connector housing in an embodiment of the present invention.

Referring to FIG. 9, an end portion of the connecting part 1*b* close to the plugging part 1*a* is provided with a groove 111. The pressure piece 3 is embedded in the groove 111 to ensure that the pressing piece 3 does not protrude from the upper end face of the connecting part 1*b*. A first clamping block 111*a* is provided in the groove 111. A low end of the inclined surface 311 is upwards provided with a first clamping groove 312. The first clamping block 111*a* is clamped in the first clamping groove 312 to fix the pressing piece 3 in the groove 111. The upper end face of the pressing piece 3 is inclined or a flat surface, as long as it can ensure that the upper end face of the pressing piece 3 does not protrude from the connecting part 1*b*.

In this embodiment, the pressing piece 3 can ensure that it does not protrude from the upper end face of the connecting part 1*b* and does not occupy additional space while satisfying the pressing requirement and providing a restoring force.

Figure 4:
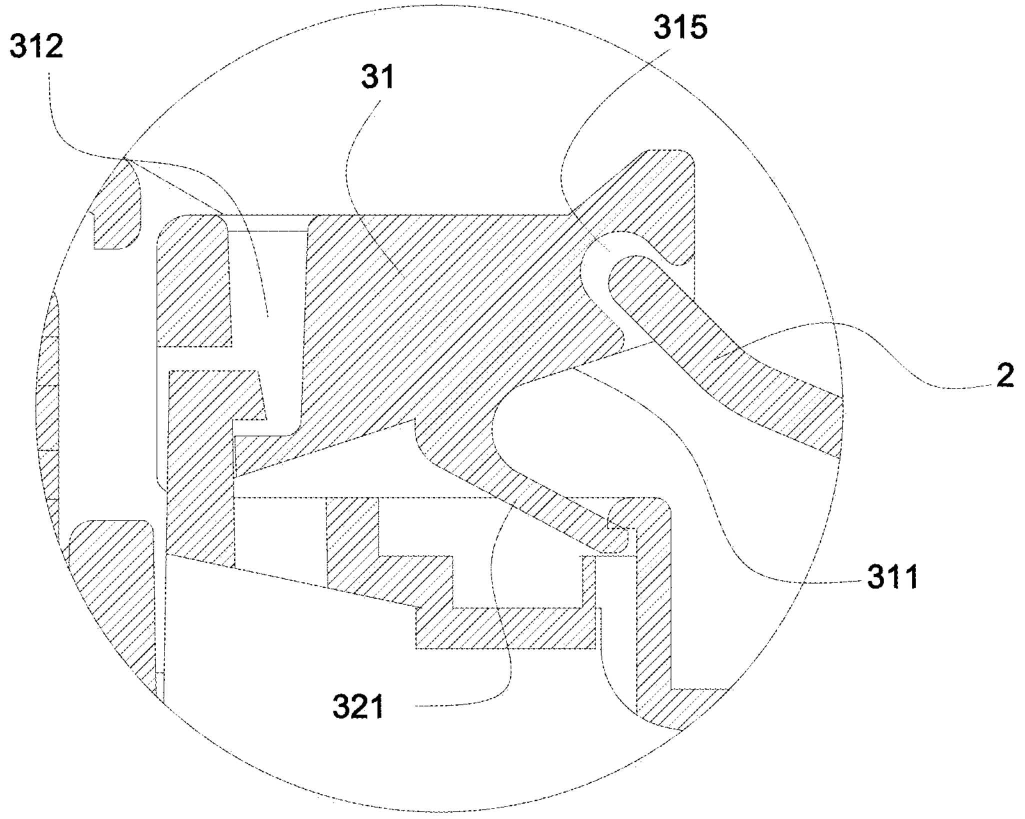
FIG. 4 illustrates a schematic diagram of a connected state of a pressing piece and a connector housing in an embodiment of the present invention.
Figure 6:
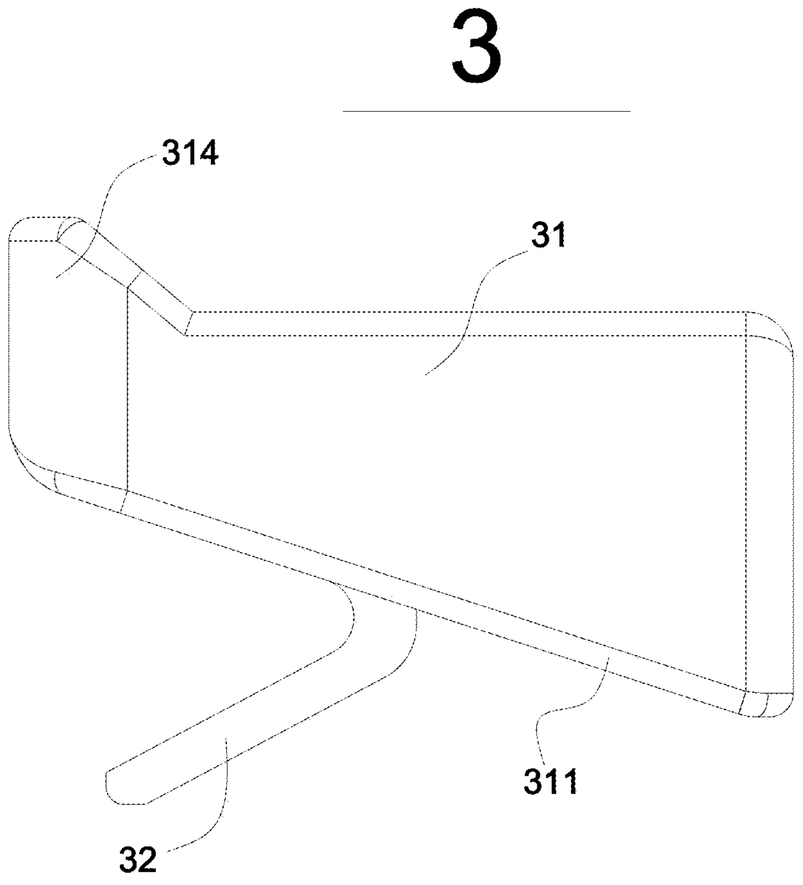
FIG. 6 illustrates a side view of a pressing piece in an embodiment of the present invention.
Figure 7:
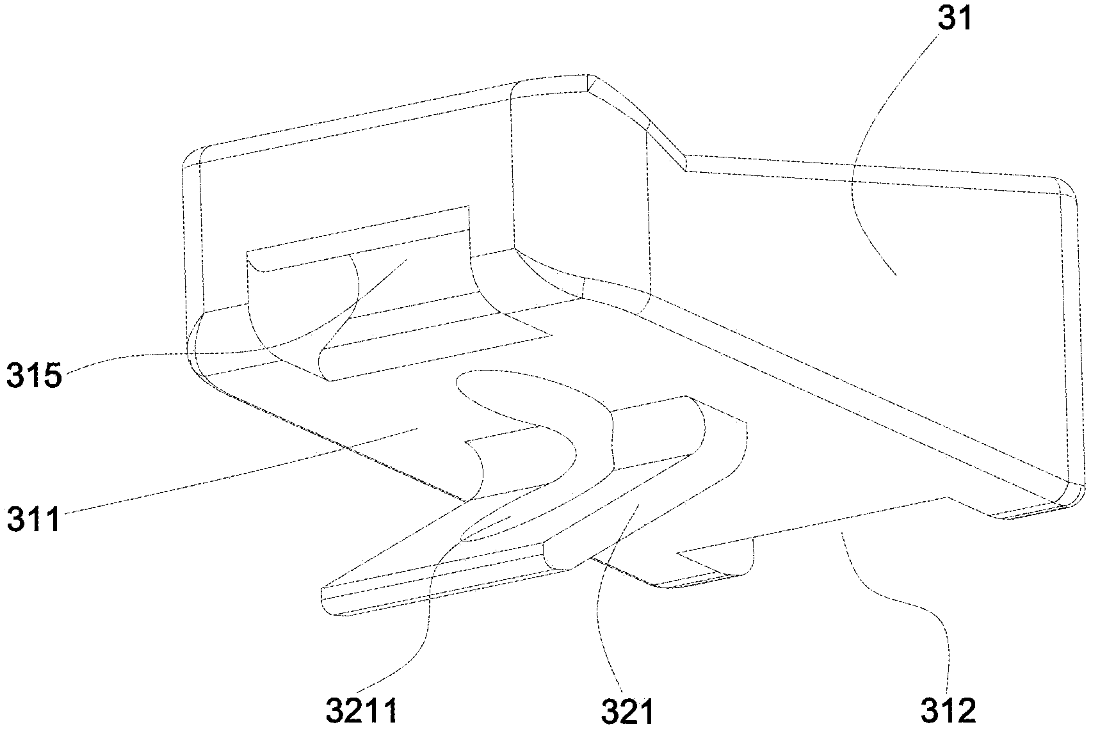
FIG. 7 illustrates a 3D structural schematic diagram of a pressing piece in an embodiment of the present invention.

In an embodiment, referring to FIG. 6, FIG. 7 and FIG. 4, the restoring part 32 is a sheet-like structure 321. The sheet-like structure 321 is inclined in the length direction. An inclination direction of the sheet-like structure 321 is opposite to an inclination direction of the inclined surface 311. A high end of the sheet-like structure 321 is connected with the inclined surface 311. A low end of the sheet-like structure 321 leans against the connecting part 1*b* to form a supporting point. When the external force presses the pressing part 31, the sheet-like structure 321 will deform, thus accumulating force for the upward restoration of the pressing part 31.

In an embodiment, the sheet-like structure 321 and the pressing part 31 are integrally formed. Of course, in another embodiment, the sheet-like structure 321 may also be detachably connected, for example, clamped, with the pressing part 31. In this case, the sheet-like structure 321 is still an elastic piece and can serve to restore the pressing part 31.

In an embodiment, in order to facilitate the positioning of the sheet-like structure 321, a first convex block 111*b* is further provided in the groove 111. The first convex block 111*b* is pressed onto the upper end face of a portion of the sheet-like structure 321. That is, the first convex block 111*b* and a bottom of the groove 111 form a limiting groove that limits the low end position of the sheet-like structure 321, so as to achieve the fixation of the low end of the sheet-like structure 321.

Figure 5:
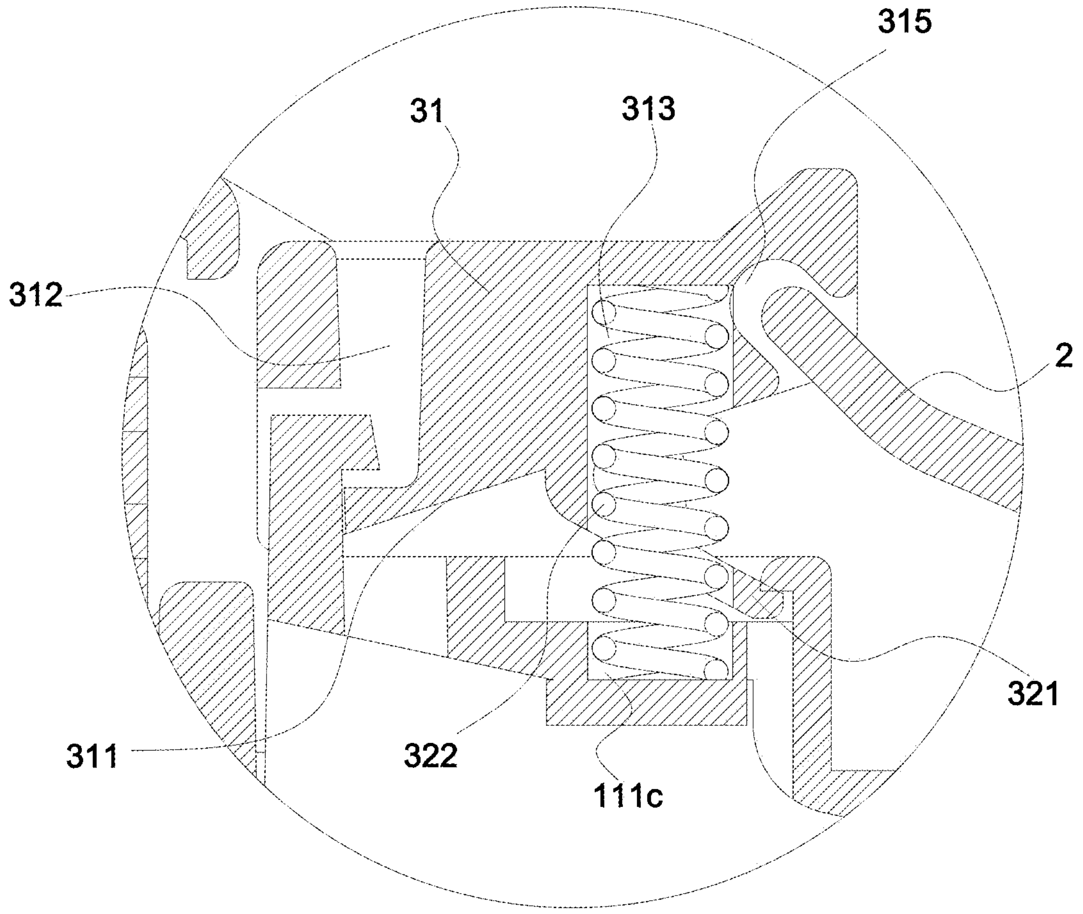
FIG. 5 illustrates a schematic diagram of a connected state of a pressing piece and a connector housing in another embodiment of the present invention.

In an embodiment, referring to FIG. 5, the restoring part 32 is a spring 322. The spring 322 is vertically provided along a height direction. One end of the spring 322 leans against the inclined surface 311. The other end leans against the connecting part 1*b*. When there is no external force, the spring 322 is in a natural state. When the external force presses the pressing part 31, the spring 322 will be compressed. When the external force is withdrawn, the spring 322 will convert the elastic force into the acting force for restoring the pressing part 31.

Referring to 5, in order to facilitate the positioning of the spring 322, the inclined surface 311 is provided with a first spring fixing groove 313, the bottom of the groove 111 of the pressing part is provided with a second spring fixing groove 111*c*, and the two end portions of the spring 322 are respectively embedded into the first spring fixing groove 313 and the second spring fixing groove 111*c*.

Figure 3:
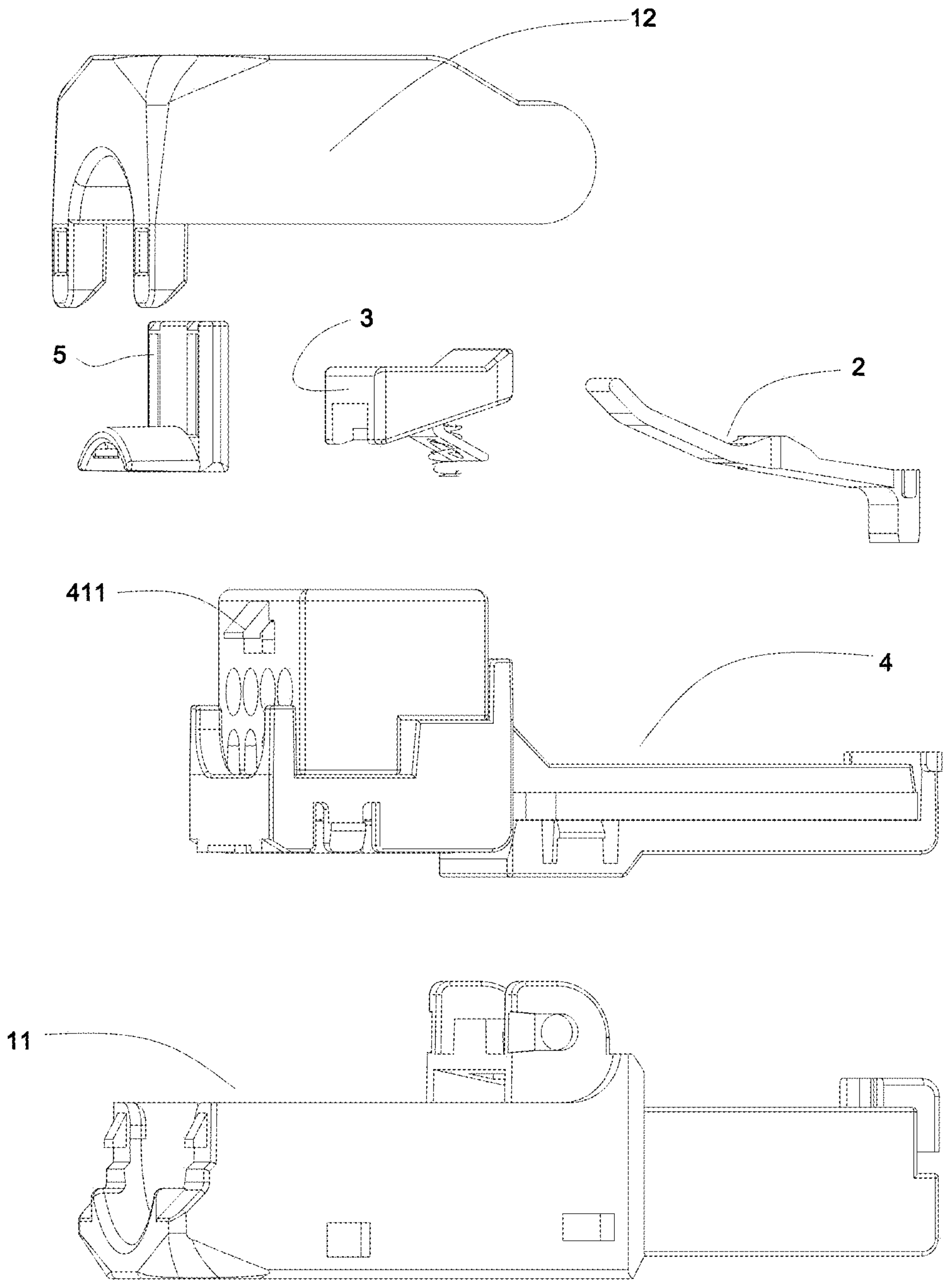
FIG. 3 illustrates an exploded diagram according to an embodiment of the present invention.

In an embodiment, referring to FIG. 3 and FIG. 5, the restoring part is a spring 322 and a sheet-like structure 321. The sheet-like structure 321 is provided with a through hole 3211 for the spring 322 to pass through. In this case, the sheet-like structure 321 and the spring 322 synchronously provide a restoring force, allowing the pressing part 31 to have a larger restoring force.

Referring to FIG. 6, an upper end face of the pressing part 31 is a flat surface, and a boss 314 protruding upwards from the upper end face of the pressing part 31 is further provided at a connection between the pressing part 31 and the spring 2. The boss 314 provides a force applying point for a finger to press.

Figure 8:
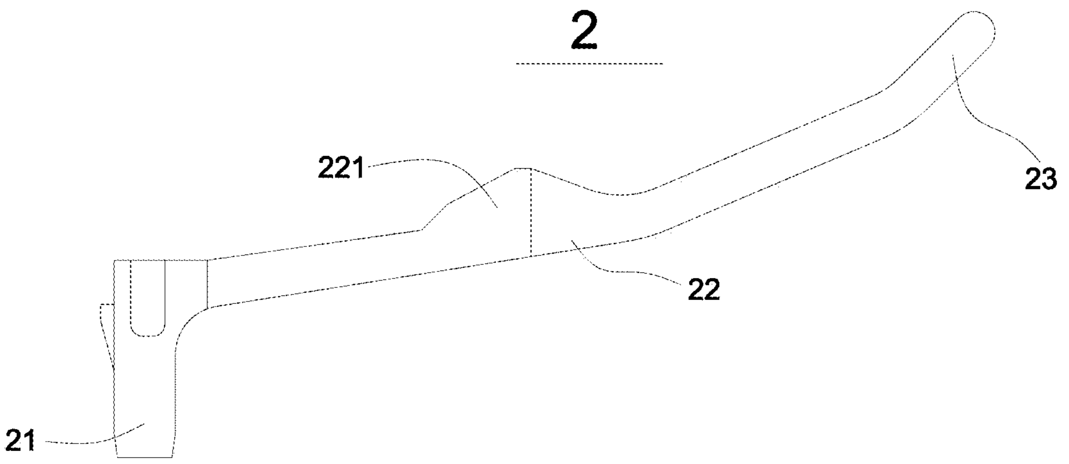
FIG. 8 illustrates a side view of an elastic piece in an embodiment of the present invention.

Referring to FIG. 8, the elastic piece 2 includes a fixed clamping block 21, a connecting plate 22, and a plugging plate 23 arranged sequentially. An end portion of the plugging part 1*a* away from the connecting part 1*b* is provided with an elastic piece 2 fixing seat. The fixed clamping block 21 is clamped in the elastic piece 2 fixing seat. The connecting plate 22 is inclined. A locking step 221 is formed on an upper end face of a middle portion of the connecting plate 22. The locking step 221 can be inserted into the socket and tightly locked with the socket. The plugging plate 23 can be inserted into the pressing part 31. The pressing part 31 is provided with a first plugging groove 315 for the plugging plate 23 to be inserted in.

Referring to FIG. 8, the plugging plate 23 is inclined in the length direction. The inclination direction of the plugging plate 23 is the same as the inclination direction of the connecting plate 22, but an included angle between the plugging plate 23 and the horizontal plane is larger than an included angle between the connecting plate 22 and the same horizontal plane. The plugging plate 23 is inclined upwards relative to the connecting plate 22 and an end portion is inserted into the first plugging groove 315. The structure of the elastic piece 2 facilitates the connection with the pressing piece 3 and the connector housing 1 on one hand, and fully utilizes its own elastic force and does not influence its own elastic force on the other hand.

Referring to FIG. 3, the connecting part 1*b* includes an upper cover 12 and a lower shell 11 provided up and down in the height direction. The plugging part 1*a* and the lower shell 11 are integrally formed. The upper cover 12 is hinged and can be fastened with the lower shell 11. The upper cover 12 and the lower shell 11 which are fastened together form an accommodating chamber. The connecting functional core 4 is arranged in the accommodating chamber. One of the upper cover 12 and the lower shell 11 is provided with a second clamping block, and the other is provided with a second clamping groove 122. When the second clamping block is clamped into the second clamping groove 122, the upper cover 12 and the lower shell 11 are fixed. The connecting functional core 4 is fixed in the accommodating chamber, and one end of the connecting functional core 4 extends to the plugging part 1*a*.

Figure 14:
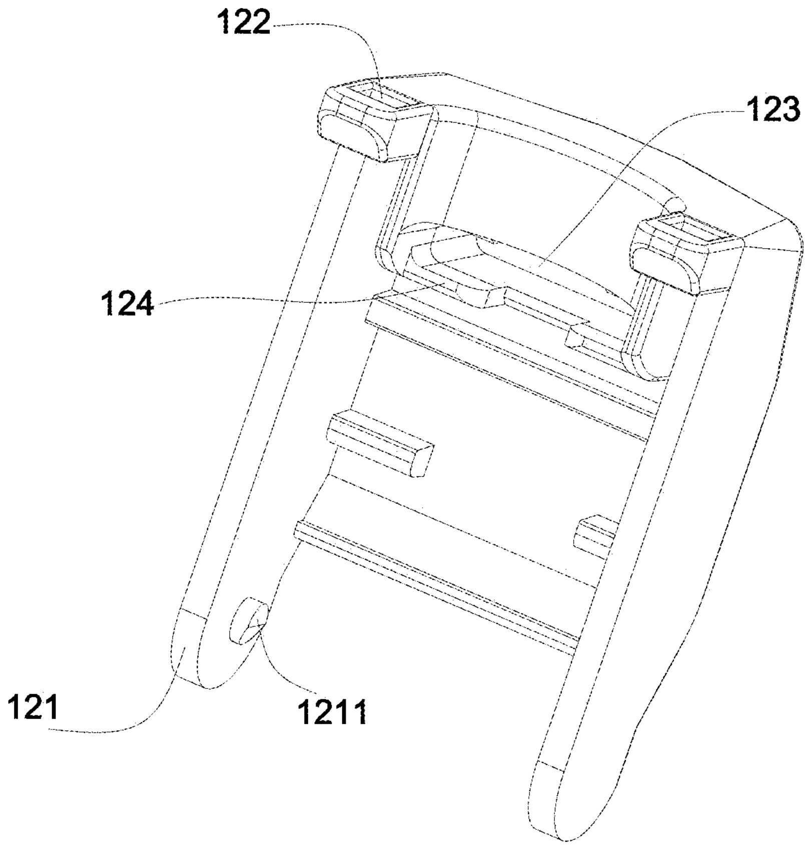
FIG. 14 illustrates a structural schematic diagram of an upper cover in an embodiment of the present disclosure.

Referring to FIG. 9 and FIG. 14, on one side of the lower shell 11 close to the plugging part 1*a* is provided with two hinging seats 112 spaced apart in the width direction. The hinging seats 112 extend upwards along the lower shell 11. One side of the upper cover 12 close to the plugging part 1*a* is provided with a notch. Two connecting arms 121 are formed on two sides of the notch. The two connecting arms 121 are respectively hinged with the hinging seats 112 to achieve the effect that the upper cover 12 swings up and down relative to the lower shell 11. The groove 111 is formed between the two hinging seats 112. The pressing piece is fixed in the groove 111 between the two hinging seats 112.

The hinging seats 112 are provided with hinging holes. Rotating shafts 1211 are provided on the opposite surfaces of the connecting arms 121. The rotating shafts 1211 are inserted into the hinging holes and rotate along their own axis in the hinging holes, thus achieving the effect that the upper cover 12 swings.

Referring to FIG. 2, one ends of the lower shell 11 and the upper cover 12 away from the plugging part 1*a* are respectively provided with two semicircles. When the lower shell 11 and the upper cover 12 are fastened, the two semicircles are connected to form a cable hole 13 for a cable to pass through. The cable coaxially passes through the cable hole 13 and is electrically connected with the connecting functional core 4.

In an embodiment, referring to FIG. 3 and FIG. 10, a cable clip 5 is further provided in the accommodating chamber. The cable clip 5 can move back and forth in a direction perpendicular to an axis direction of the cable to get close to or away from the cable. When the cable clip 5 moves towards the cable, it can be clamped with the connecting functional core 4 to press the cable tightly.

Figure 12:
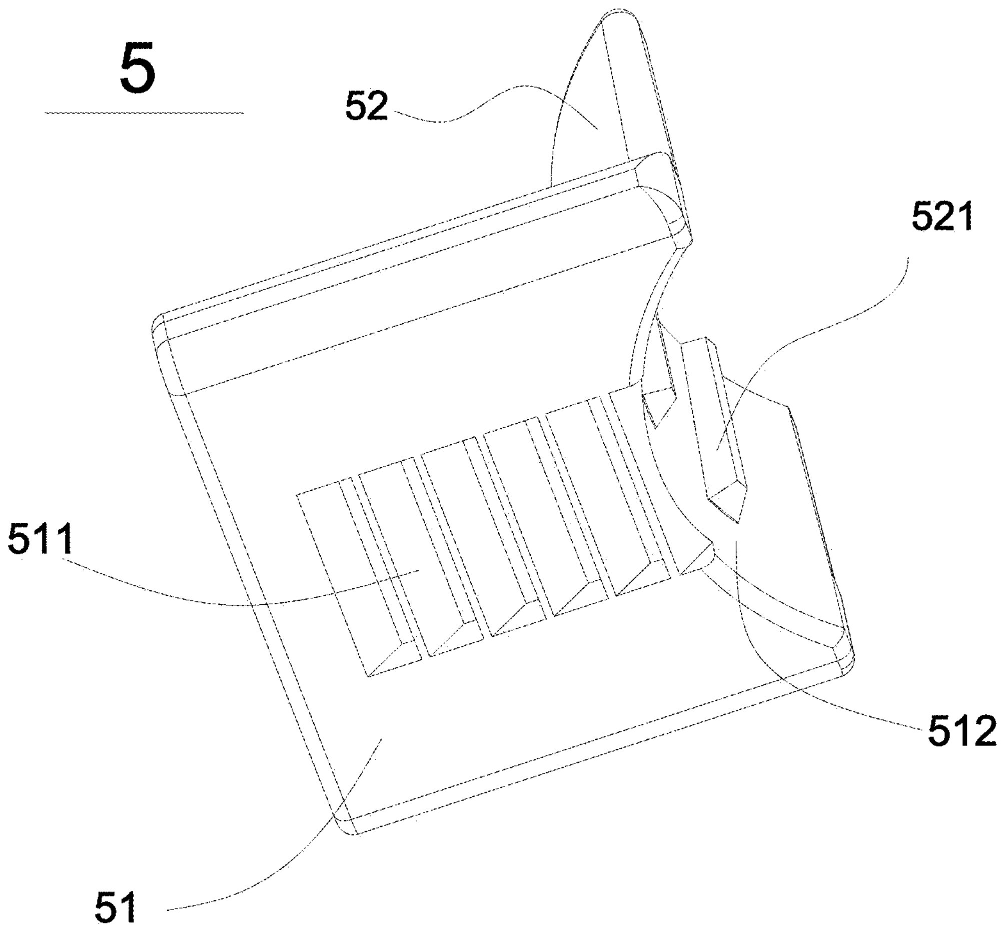
FIG. 12 illustrates a structural schematic diagram of a cable clip in an embodiment of the present invention.

Referring to FIG. 12, the cable clip 5 includes a sheet-like base plate 51. One side of the base plate 51 close to the cable is provided with an arc-shaped positioning edge 512. An end face of the base plate 51 close to the connecting functional core 4 is provided with at least one third clamping groove 511. At least one clamping protrusion 411 fit with the third clamping groove 511 is provided on the connecting functional core 4. After the lower shell 11 and the upper cover 12 are fastened, the cable clip 5 is pushed towards the cable, and the clamping protrusion 411 is clamped into the clamping groove to achieve the positioning of the cable.

Referring to FIG. 14, the upper cover 12 is provided with an opening 123 communicated with the accommodating chamber. By using a tool and passing the tool through the opening 123, an acting force is applied to the cable clip 5 to achieve the movement of the cable clip 5 towards the direction of the cable.

In this embodiment, by providing the cable clip 5 and adding a clamping protrusion 411 fit with the third clamping groove 511 in the cable clip 5 on the connecting functional core 4, the third clamping groove 511 is fit with the clamping protrusion 411 to achieve the clamping between the cable clip 5 and the cable, and no clamp structure needs to be provided at the end portion of the connector. The cable clip 5 is located inside the connector. It is not needed to additionally provide a separate clamp structure for cable tying at an outer end portion of the connector, so that the overall length of the connector is smaller, which can reach 36 mm. Moreover, the connecting functional core 4 is a structure that is already provided in the conventional technology connector, so it will not cause significant changes in the length of the connector housing 1 due to the arrangement of a clamping protrusion 411.

Referring to FIG. 12, multiple third clamping grooves 511 are provided. The multiple third clamping grooves 511 are provided at an interval along the movement direction of the cable clip 5, thus compensating for the error of the cable in the thickness direction and achieving the pressing and positioning of cables with different diameters.

Figure 11:
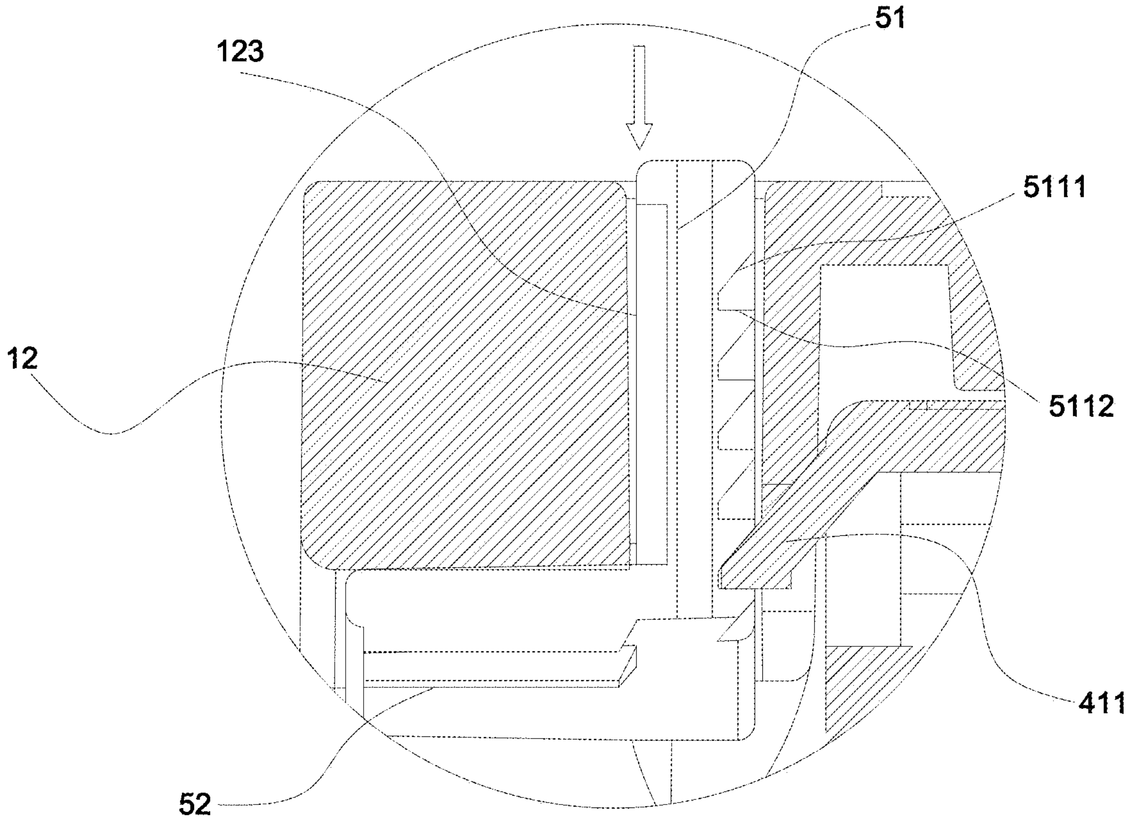
FIG. 11 illustrates an enlarged diagram of position A in FIG. 10.
Figure 13:
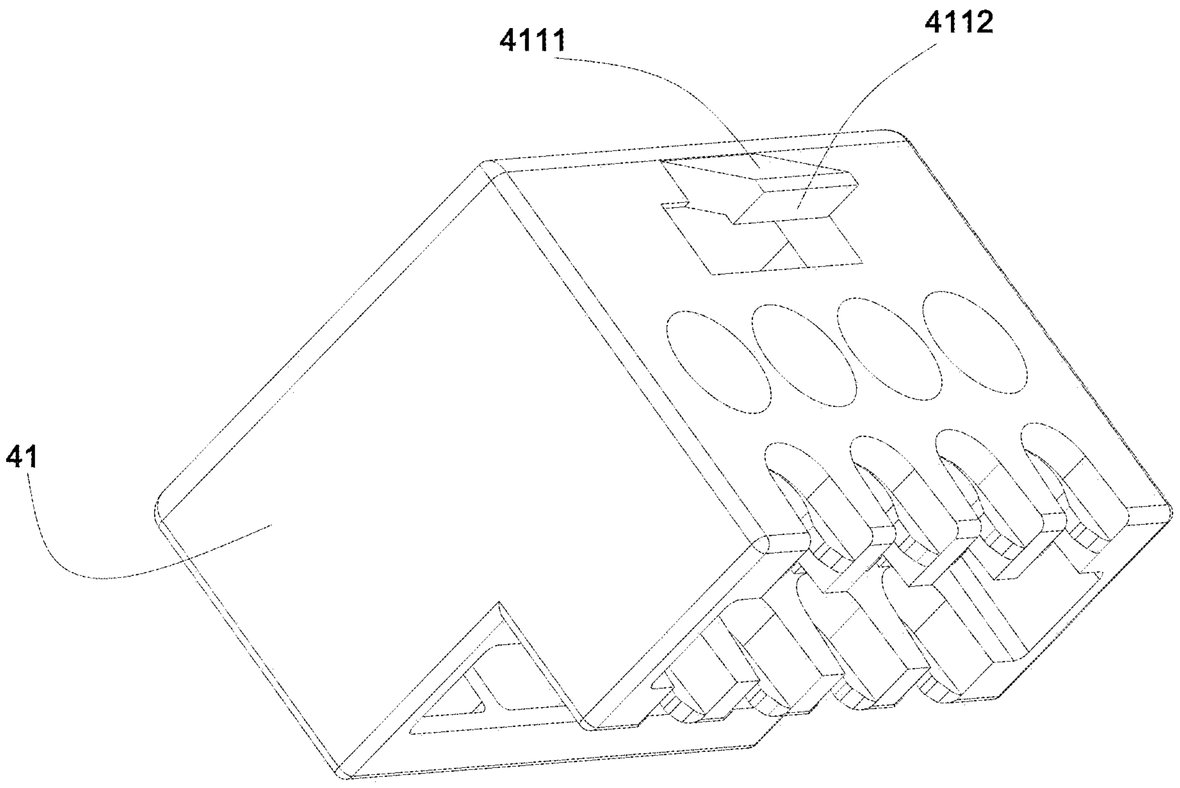
FIG. 13 illustrates a structural schematic diagram of a cable gland in an embodiment of the present invention.

Referring to FIG. 11, the third clamping groove 511 includes a guide slope 5111 and a backstop surface 5112. Referring to FIG. 13, the clamping protrusion 411 includes a clamping surface 4111 and a retaining surface 4112. The backstop surface 5112 of the third clamping groove is capable of pressing against the retaining surface 4112 of the clamping protrusion. Therefore, during clamping, the guide slope 5111 of the third clamping groove 511 is in contact with the clamping surface 4111 of the clamping protrusion 411 and moves forward along the clamping surface 4111, thus clamping the clamping protrusion 411 into the groove body of the third clamping groove 511. After the cable is clamped, when the base plate of the cable clip 5 moves away from the cable due to the expansion force of the cable, the backstop surface 5112 of the third clamping groove 511 presses against the retaining surface 4112 of the clamping protrusion, thus ensuring that the cable clip 5 will not retreat and achieving the clamping and fixing of the cable.

In an embodiment, the cable clip 5 further includes a clamping edge 52 arranged along the positioning edge 512 and connected with the base plate 51. The clamping edge 52 extends along the axis direction of the cable. The clamping edge 52 extends towards the surface of one side of the base plate 51 away from the groove. The clamping edge 52 increases the contact area with the cable, thus ensuring the tight clamping of the cable.

In an embodiment, a convex rib 521 extending along the axis of the cable is further provided on the contact surface between the clamping edge 52 and the cable, so that the contact surface between the clamping edge 52 and the cable is uneven, thus increasing the friction with the cable.

Referring to FIG. 14, one side of the upper cover 12 facing to the cable is further provided with a guide plate 124. The base plate 51 slides along the guide plate 124. The guide plate 124 guides the movement of the cable clip 5 and provides support.

Of course, in an embodiment, the opening 123 may be provided in the lower shell 11, which can also play a role in pushing the cable clip 5 and fixing the cable.

In this embodiment, when the lower shell 11 is a metal component, the cable clip 5 is also a metal component. In this case, the surface of the cable in contact with the cable clip 5 is provided with a grounding layer that is conducted with the core of the cable. While positioning the cable, the cable clip 5 will achieve the grounding of the cable, and the anti-interference performance strong. But if the lower shell 11 is an insulated plastic component, the cable clip 5 is also an insulated injection-molded component.

In an embodiment, the number of the clamping protrusion 411 is one, which is located at a position directly facing to a middle portion of the third clamping groove 511. In other possible embodiments, the number of the clamping protrusions 411 may also be two, and the two clamping protrusions are respectively located at positions close to two ends of the third clamping groove 511 in the width direction.

Referring to FIG. 10, the connecting functional core 4 includes a cable gland 41, a terminal block 42, a PCB board 43, and a fixing plate 44. The terminal block 42 is fixed in the accommodating chamber and is clamped with the lower shell 11. The terminal block 42 extends into the plugging part 1*a*. The cable gland 41 is located in the accommodating chamber. The cable gland 41 is plugged with the terminal block 42 and located above the terminal block 42. The cable gland 41 is fixed with the cable. The PCB board 43 is fixed with the terminal block 42. A cable clamping blade on the terminal block 42 is connected with the PCB board 43 and the cable gland 41. The fixing plate 44 is clamped and fixed with the lower shell 11, and extends into the plugging part 1*a*. The fixing plate 44 tightly presses the PCB board 43 under the terminal block 42.

Referring to FIG. 13, the cable gland 41 is a 90-degree cable gland 41. Since the cable gland 41 is provided on one side close to the upper cover 12, if the opening 123 is provided in the upper cover 12, the clamping protrusion is provided on the cable gland 41. The cable gland 41 is a component of the connecting functional core 4 and does not cause any size change in the connecting functional core 4.

The cable gland 41 includes a vertical surface which is close to the cable hole 13 and vertically provided. The clamping protrusion 411 is located on the vertical surface.

In another embodiment, the clamping protrusion 411 may also be provided on the terminal block 42. In this case, the opening 123 is provided in the lower shell 11.

By using the registered jack connector in this embodiment, since the cable clip 5 is provided on the connector housing 1 and the cable clip 5 is located in the accommodating chamber to fix the cable entering the accommodating chamber, it is ensured that the cable is tightly plugged into the connector housing 1 and will not get loose under the action of the external force. The built-in structure of the cable clip 5 eliminates the need to increase the length of the connector housing 1, reduces the length of the connector, and meets the needs of use in narrow environments. At the same time, the detachment device adopts an elastic piece 2 and a pressing piece 3 in separate structures, thus increasing the elastic force of the detachment device and facilitating pressing. The added restoring part 32 provides a restoring elastic force, allowing the entire detachment device to have a larger restoring force even in the case of a smaller length, and thus achieving the plugging in narrow space.

Embodiment 2

The present invention further discloses a registered jack connector, which includes a connector housing 1. The connector housing 1 defines to form an accommodating chamber. A connecting functional core 4 is provided in the accommodating chamber. The connecting functional core 4 is fixedly connected with the cable. The cable passes through the connector housing 1. An end portion of the connector housing 1 in a length direction is provided with a cable hole 13 for a cable to pass through.

A cable clip 5 is further provided in the accommodating chamber. The cable clip 5 can move back and forth in a direction perpendicular to an axis direction of the cable to get close to or away from the cable. When the cable clip 5 moves towards the cable, it can be clamped with the connecting functional core 4 to press the cable tightly. The connector housing 1 is provided with an opening 123 communicated with the accommodating chamber and corresponding to the position of the cable clip, and the cable clip 5 moves towards the direction of the cable and is clamped with the connecting functional core by passing the cable clip through the opening and applying an acting force to the cable clip 5.

The structure of the cable clip 5 is the same as that in embodiment 1. The cable clip 5 includes a sheet-like base plate 51. An arc-shaped positioning edge 512 is provided on one side of the base plate 51 close to the cable. A surface of at least one side of the base plate 51 is provided with at least one third clamping groove 511. At least one clamping protrusion 411 fit with the third clamping groove 511 is provided on the connecting functional core 4. When the clamping protrusion 411 is clamped into the third clamping groove 511, the position of the cable clip 5 is fixed. In this case, the positioning edge 512 leans against the cable and tightly presses the cable.

The connecting functional core 4 is the same as that in embodiment 1, and includes a cable gland 41. The cable gland 41 is fixedly connected with the cable. The clamping protrusion is fixedly provided on the cable gland 41.

The connector housing 1 includes a lower shell 11 and an upper cover 12 which are hinged. The lower shell 11 and the upper cover 12 can be fastened and fixed. Since the cable gland 41 is provided at a position close to the upper cover 12 in the accommodating chamber, an opening 123 is provided in the upper cover 12.

In this embodiment, on the connector, by providing the cable clip 5 and adding a clamping protrusion 411 fit with the third clamping groove 511 in the cable clip 5 on the connecting functional core 4, the third clamping groove 511 is fit with the clamping protrusion 411 to achieve the clamping between the cable clip 5 and the cable, and no clamp structure needs to be provided at the end portion of the connector. The cable clip 5 is located inside the connector. It is not needed to additionally provide a separate clamp structure for cable tying at an outer end portion of the connector, so that the overall length of the connector is smaller, which can reach 36 mm. Moreover, the connecting functional core 4 is a structure that is already provided in the conventional technology connector, so it will not cause significant changes in the length of the connector housing 1 due to the arrangement of a clamping protrusion 411, thus greatly reducing the length of the connector.

The above embodiments are only intended to describe the technical concept and characteristics of the present invention, are for the purpose of allowing those skilled in the art to understand the content of the present invention and implement it, and cannot be understood as limiting the scope of protection of the present invention. Any equivalent changes or modifications made according to the essence of the present invention should be included within the scope of protection of the present invention.

What is claimed is:

1. A registered jack connector comprising a connector housing, a detachment device being provided on the connector housing, the detachment device comprising:

an elastic piece, the elastic piece being inclined along a length direction, a low end of the elastic piece being clamped with an end portion of the connector housing; and a pressing piece, the pressing piece comprising a pressing part and a restoring part, the pressing part comprising an inclined surface, the inclined surface being inclined along the length direction and opposite to an inclination direction of the elastic piece, the pressing part being clamped with a high end of the elastic piece at a high end of the inclined surface, the pressing part being clamped with the connector housing at a low end of the inclined surface, the restoring part being located at a lower end of the inclined surface and providing an upward restoring force for the pressing part.

2. The registered jack connector according to claim 1, wherein the restoring part comprises at least one of a sheet-like structure and a spring;

the sheet-like structure is inclined in the length direction and opposite to an inclination direction of the inclined surface, a high end of the sheet-like structure is connected with the inclined surface, and a low end of the sheet-like structure leans against the connector housing;

the spring is vertically provided along a height direction, one end of the spring leans against the inclined surface, and the other end leans against the connector housing.

3. The registered jack connector according to claim 2, wherein the sheet-like structure and the pressing part are integrally formed or are separate structures.

4. The registered jack connector according to claim 2, wherein the sheet-like structure is provided with a through hole for the spring to pass through.

5. The registered jack connector according to claim 2, wherein the inclined surface and the connector housing are respectively provided with spring fixing grooves for end portions of the spring to be embedded in.

6. The registered jack connector according to claim 1, wherein the connector housing comprises a plugging part and a connecting part sequentially provided in the length direction, and the height of an upper end face of the plugging part is less than the height of an upper end face of the connecting part;

the pressing piece is clamped with the connecting part, and the highest point of the pressing piece is not higher than the upper end face of the connecting part.

7. The registered jack connector according to claim 1, wherein an upper end face of the pressing part is a flat surface, and a boss protruding upwards from the upper end face of the pressing part is further provided at a connection between the pressing part and the spring.

8. The registered jack connector according to claim 1, wherein the connector housing comprises an upper cover and a lower shell, the upper cover and the lower shell form an accommodating chamber, a connecting functional core connected with a cable is provided in the accommodating chamber, and a cable hole is formed between the upper cover and the lower shell for the cable to pass through;

a cable clip is further provided in the accommodating chamber, the cable clip is movable back and forth in a direction perpendicular to an axis direction of the cable to get close to or away from the cable, the upper cover or the lower shell is provided with an opening communicated with the accommodating chamber and corresponding to the position of the cable clip, and the cable clip moves towards the direction of the cable and is clamped with the connecting functional core by passing the cable clip through the opening and applying an acting force to the cable clip.

9. The registered jack connector according to claim 8, wherein the cable clip comprises a sheet-like base plate, an arc-shaped positioning edge is provided on one side of the base plate close to the cable, a surface of at least one side of the base plate is provided with at least one third clamping groove, and at least one clamping protrusion fit with the third clamping groove is provided on the connecting functional core.

10. The registered jack connector according to claim 8, wherein the third clamping groove comprises a guide slope and a backstop surface, the clamping protrusion comprises a clamping surface and a retaining surface, and the backstop surface of the third clamping groove is capable of pressing against the retaining surface of the clamping protrusion.

11. The registered jack connector according to claim 9, wherein the connecting functional core comprises a cable gland fixedly connected with the cable, and the clamping protrusion is provided on the cable gland.

12. The registered jack connector according to claim 8, wherein the upper cover is hinged with the lower shell, the upper cover is capable of swinging up and down along the lower shell and being fixedly fastened with the lower shell, and the opening is provided in the upper cover.

13. The registered jack connector according to claim 7, wherein the connector housing comprises an upper cover and a lower shell, the upper cover and the lower shell form an accommodating chamber, a connecting functional core connected with a cable is provided in the accommodating chamber, and a cable hole is formed between the upper cover and the lower shell for the cable to pass through;

a cable clip is further provided in the accommodating chamber, the cable clip is movable back and forth in a direction perpendicular to an axis direction of the cable to get close to or away from the cable, the upper cover or the lower shell is provided with an opening communicated with the accommodating chamber and corresponding to the position of the cable clip, and the cable clip moves towards the direction of the cable and is clamped with the connecting functional core by passing the cable clip through the opening and applying an acting force to the cable clip.

* * * * *